United States Patent
Quinn et al.

(10) Patent No.: US 7,591,353 B2
(45) Date of Patent: Sep. 22, 2009

(54) DECOUPLED MONO TUBE DAMPER ASSEMBLY

(75) Inventors: Shawn G. Quinn, Grand Blanc, MI (US); Gregory J. Fadler, Commerce Township, MI (US); William C. Gregory, Milford, MI (US); Carl T. Wright, Highland, MI (US); Kenneth L. Oblizajek, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 38 days.

(21) Appl. No.: 11/290,679

(22) Filed: Nov. 30, 2005

(65) Prior Publication Data

US 2007/0119671 A1  May 31, 2007

(51) Int. Cl.
  *F16F 9/36* (2006.01)
(52) U.S. Cl. .................. 188/322.17; 267/220; 267/35; 267/293
(58) Field of Classification Search ............ 188/322.16, 188/322.17, 322.19; 267/219, 220, 257, 267/35, 293
See application file for complete search history.

(56) References Cited

U.S. PATENT DOCUMENTS

| | | | | |
|---|---|---|---|---|
| 2,856,035 A | * | 10/1958 | Rohacs | 188/269 |
| 4,161,304 A | * | 7/1979 | Brenner et al. | 267/140.13 |
| 5,110,081 A | * | 5/1992 | Lang, Jr. | 248/635 |
| 5,366,048 A | * | 11/1994 | Watanabe et al. | 188/267.1 |
| 5,431,260 A | * | 7/1995 | Gross et al. | 188/321.11 |
| 5,456,454 A | * | 10/1995 | Schulz et al. | 267/293 |
| 5,544,725 A | * | 8/1996 | Handke et al. | 267/221 |
| 5,628,388 A | * | 5/1997 | Angermann | 188/321.11 |
| 5,984,060 A | * | 11/1999 | Clark et al. | 188/322.16 |

* cited by examiner

*Primary Examiner*—Xuan Lan Nguyen
(74) *Attorney, Agent, or Firm*—Dierker & Associates, P.C.

(57) ABSTRACT

A decoupled mono tube damper assembly includes an outer tube attached to a vehicle's unsprung mass. The outer tube has a base and a sleeve end. An outer tube sleeve engaging end of an inner tube is slidingly engaged with the sleeve end. The inner tube has an end distal to the sleeve engaging end, and is attached to the vehicle's sprung mass at the distal end. A damper rod has one opposed end extending axially into a base aperture, and an opposed end connecting to the inner tube. The rod moves axially relative to the outer tube. A low amplitude energy-managing member is operatively disposed within the outer tube, and has a throughbore receiving the rod. A travel-limiting member attaches to the rod and is engageable with the energy-managing member to constrain axial movement of the rod through the outer tube base to a predetermined limit.

18 Claims, 4 Drawing Sheets

DECOUPLED MONO TUBE DAMPER ASSEMBLY

TECHNICAL FIELD

This disclosure relates generally to damper assemblies, and more particularly to decoupled mono tube damper assemblies.

BACKGROUND

Vehicles are generally equipped with a shock or damper system that works to cushion the ride when road conditions would otherwise cause a bumpy ride. There are instances, however, when the road conditions appear to be substantially smooth, and the passengers still may experience an objectionable vibration. This vibration extends from the floor of the vehicle, and may result from minor road irregularities and internally generated forces that are typically not severe enough to appreciably deflect the vehicle's main shock or damper system. As such, a passenger's ride may result in discomfort, even when road conditions appear to be substantially smooth.

Thus, it would be desirable to provide a shock or damper system that substantially reduces such vibrations before the vehicle's main shock/damper system is relatively free to move.

SUMMARY

Disclosed is a decoupled mono tube damper assembly for a vehicle having an unsprung mass and a sprung mass. The damper assembly includes an outer tube adapted to be attached to the unsprung mass. The damper assembly has a base (having an aperture therethrough) and a sleeve end. An inner tube has an outer tube sleeve engaging end slidingly engaged with the sleeve end, and an end distal to the sleeve engaging end. The inner tube is adapted to be attached to the sprung mass at the distal end. A damper rod has two opposed end regions, one of which extends axially into the base aperture, and the other of which connects to the inner tube. The damper rod is adapted to move axially relative to the outer tube. Further, a low amplitude energy-managing member is operatively disposed at least partially within the outer tube. The energy-managing member also has a throughbore which receives the damper rod. One or more travel-limiting member(s) is/are attached to the damper rod and is/are engageable with the energy-managing member. The travel-limiting member is adapted to constrain axial movement of the rod through the outer tube base to a predetermined limit.

BRIEF DESCRIPTION OF THE DRAWINGS

Objects, features and advantages of embodiments of the present disclosure may become apparent by reference to the following detailed description and drawings, in which like reference numerals correspond to similar, though not necessarily identical components. For the sake of brevity, reference numerals having a previously described function may not necessarily be described in connection with other drawings in which they appear.

DETAILED DESCRIPTION OF THE EMBODIMENTS

Embodiment(s) of the damper assembly as defined herein may be used in desired applications, one non-limitative example of which includes front suspensions of a vehicle. The damper assembly advantageously assists in decreasing shaking on relatively smooth roads (e.g., as produced with minor road excitation and potentially internal force systems), thereby providing a substantially smoother vehicle ride. Embodiment(s) of the damper assembly are decoupled, as they desirably manage (one non-limitative example of which managing includes absorbing) energy that is otherwise unmanaged when movements are too small to substantially deflect a more typical damper arrangement.

Figure 1:
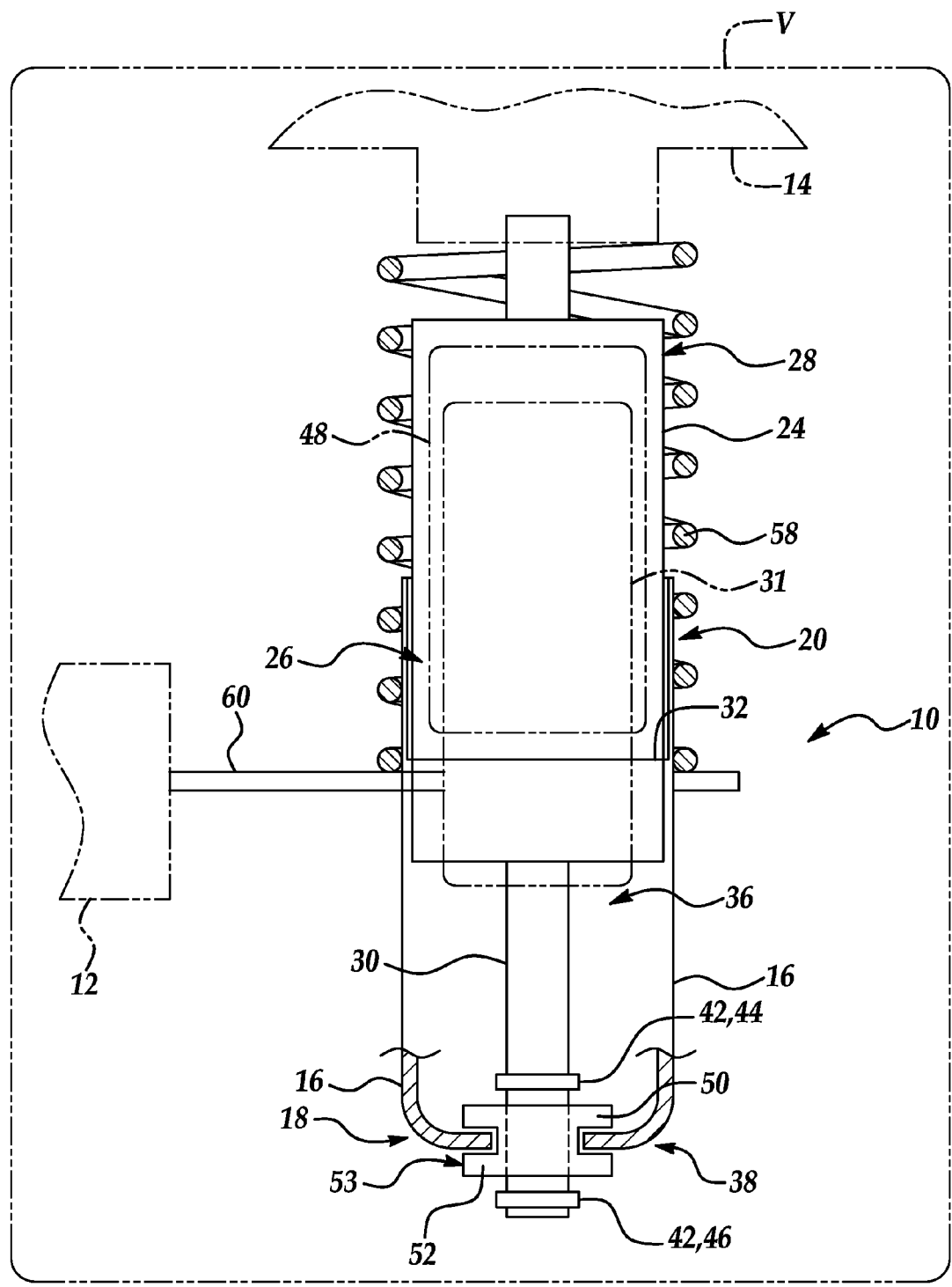
FIG. 1 is a semi-schematic view of an embodiment of a decoupled mono tube damper assembly including a transition from a first semi-schematic view of a top portion thereof to a second semi-schematic view of a bottom portion thereof.

Referring now to FIG. 1, an embodiment of a decoupled mono tube damper assembly 10 for a vehicle V is depicted. It is to be understood that the vehicle V generally has an unsprung mass 12 and a sprung mass 14, both of which are shown in phantom. In an embodiment, the unsprung mass 12 motion to the sprung mass 14 motion has a phase angle of about 90° or greater.

An embodiment of the damper assembly 10 includes an outer tube 16. The outer tube 16 is attached to the unsprung mass 12. A non-limitative example of outer tube 16 is a damper body. In an embodiment, the outer tube 16 has a base 18 and a sleeve end 20. It is to be understood that the base 18 may have an aperture 22 extending therethrough.

Figure 2:
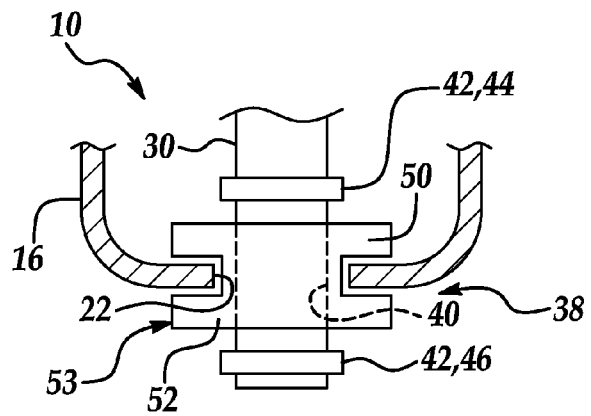
FIG. 2 is an enlarged view of the bottom portion of the decoupled mono tube damper assembly of FIG. 1.

As depicted in FIGS. 1 and 2, an inner tube 24 has an outer tube sleeve engaging end 26 and an end 28 distal to the sleeve engaging end 26. The outer tube sleeve engaging end 26 may be slidingly engaged with the sleeve end 20 of the outer tube 16. The inner tube 24 may be attached to the sprung mass 14 at the distal end 28. A non-limitative example of an inner tube 24 is a damper tube.

A damper rod 30 has two opposed end regions 34, 36. In an embodiment, one of the two opposed end regions 34 extends axially into the base aperture 22, and the other of the two opposed end regions 36 may connect to a piston 31 (shown schematically and in phantom) that is slideable within the inner tube 24. Generally, the damper rod 30 is configured to move axially relative to the outer tube 16 as a result of forces transmitted thereto.

Embodiment(s) of the damper assembly 10 further include a low amplitude energy-managing member 38 operatively disposed at least partially within the outer tube 16. An embodiment of the energy-managing member 38 has a throughbore 40, which is capable of receiving the damper rod 30.

It is to be understood that the low amplitude energy-managing member 38 manages energy at displacements that are smaller (e.g., forces may be insufficient to overcome the stiction and/or friction at various sliding interfaces) than those that are capable of activating a conventional damping mechanism 48 (via the damping rod 30) operatively disposed within the inner tube 24. As such, it is to be understood that low amplitude energy may be of any magnitude lower than that energy which activates a conventional damping mechanism 48. In one non-limitative embodiment, low amplitude energy is energy resulting from road dither. In a further non-limitative embodiment, low amplitude energy is energy resulting from displacement(s) ranging from about 0.05 mm to about 2 mm.

In one embodiment, the low amplitude energy-managing member 38 is formed from one or more of viscoelastic materials, thermoplastic materials, thermoplastic elastomer materials, thermoset materials, and combinations thereof.

Non-limitative examples of thermoplastic materials may include polyamides (nylons), polystyrenes, polyethyleneterephthalates (PET), polyurethanes, and/or the like, and/or combinations thereof. A non-limitative example of a thermoplastic polyurethane foam is available under the tradename PLURALUX from BASF Corp. located in Florham Park, N.J.

Examples of viscoelastic materials may include, but are not limited to magneto-rheological (MR) fluid-filled damping materials, electro-rheological (ER) fluids, passive fluid materials, substrate materials, and/or combinations thereof. Specific non-limitative examples of viscoelastic materials include those commercially available under the tradename ISODAMP C-1002 from Aearo Company located in Indianapolis, Ind., vinyl solids such as those commercially available under the tradenames ISOLOSS HD and ISOLOSS VL from Aearo Company, urethane solids such as those commercially available under the tradenames ISODAMP C-1105 and ISODAMP C-1100 from Aearo Company, and/or combinations thereof. It is to be understood that an embodiment of the device 10 including the fluid-filled damping materials discussed herein may further include additional and/or alternate internal mechanization and a confining device.

A non-limitative example of a thermoset material includes thermoset polyurethane foams.

In a further embodiment, the polymeric materials are thermoplastic materials including thermoplastic olefins (TPOs). It is to be further understood that any suitable thermoplastic olefins may be chosen. In an embodiment, the thermoplastic olefins include at least one of polypropylenes, polyethylenes, elastomers, impact copolymers thereof, and/or mixtures thereof. In a further embodiment, the thermoplastic olefins include at least one of polypropylene homopolymers, impact modified polypropylenes, ethylene-propylene elastomers, and/or mixtures thereof.

Figure 3:
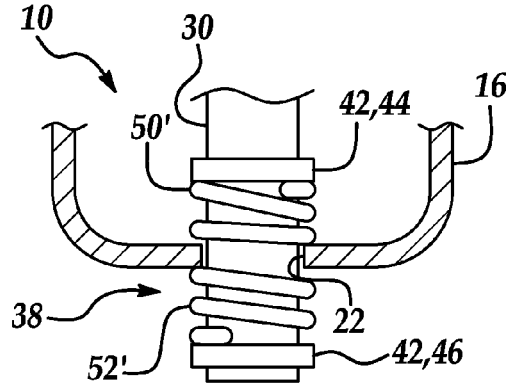
FIG. 3 is a semi-schematic view of a portion of an alternate embodiment of a decoupled mono tube damper assembly.

In an alternate embodiment, the low amplitude energy-absorbing member 38 is a spring (a non-limitative example of which includes a helical spring) (see FIG. 3).

Still further, the low amplitude energy-managing member 38 may include a low amplitude compression responsive member 50, 50' and a low amplitude extension responsive member 52, 52' (embodiments of which are also depicted in FIGS. 2 and 3). It is to be understood that each of the low amplitude compression responsive member 50, 50' and the low amplitude extension responsive member 52, 52' may be formed of the previously described low amplitude energy-managing member materials. Further, member 50, 50' may be formed of the same and/or a different material than member 52, 52'. This may advantageously allow for the same and/or different damping properties in compression and rebound.

Referring now to FIG. 2, in an embodiment, the compression responsive member 50 and the extension responsive member 52 form an integral member 53 extending through the base aperture 22. As depicted, the extension responsive member 52 forms a flanged face of the integral member 53, disposed outside of the outer tube base 18. The compression responsive member 50 forms an opposed flanged face of the integral member 53, disposed within the outer tube base 18.

Referring now to FIGS. 1 and 3, in an alternate embodiment, the compression responsive member 50, 50' and the extension responsive member 52, 52' are separate members. In this embodiment, the extension responsive member 52, 52' is operatively disposed outside of the outer tube base 18, and the compression responsive member 50, 50' is operatively disposed within the outer tube base 18.

In any of the embodiments, it is to be understood that responsive members 50, 50', 52, 52' may be pre-loaded to a predetermined load, if desired. Such preloading may result from mechanical means in addition to loads created in confining internally pre-charged gas.

Referring to FIGS. 1 through 3 together, one or more travel-limiting member(s) 42 is/are attached to the damper rod 30. It is to be understood that the travel limiting member(s) 42 is/are any suitable member that allows the energy-managing member 38 to stop traveling and to activate the main damper 48. In one non-limitative embodiment, the base 18 of the outer tube 16 and a washer may be used as the travel limiting members 42. In a further non-limitative embodiment, the travel limiting members 42 are formed from E-clips and/or the like. Yet further, it is to be understood that, at various stages of operation, the travel-limiting member 42 may contact the energy-managing member 38, may contact the outer tube 16, and/or member 42 may contact both the energy-managing member 38 and the outer tube 16.

It is to be further understood that the travel-limiting member 42 may constrain axial movement of the rod 30 through the outer tube base 18 to a predetermined limit. This predetermined limit may be based on the particular vehicle into which damper assembly 10 is incorporated, as each model of vehicle may be different, e.g., the predetermined limit may be "tuned" to a particular vehicle. The predetermined limit may be varied by adjusting the preload on travel limiters 44 and/or 46. In one embodiment, the predetermined limit may be about +/−0.05 mm. In an alternate embodiment, the predetermined limit may be about +/−2 mm.

In an embodiment, the travel-limiting member 42 may include a compression travel-limiting member 44 attached to the damper rod 30. The compression travel-limiting member 44 is adapted to constrain outward movement of the rod 30 through the outer tube base 18. It is to be understood that the compression travel-limiting member 44 may be positioned intermediate the compression responsive member 50, 50' and the other opposed end region 36 of the damper rod 30.

The travel-limiting member 42 may also include an extension travel-limiting member 46 attached to the damper rod 30. The extension travel-limiting member 46 is adapted to constrain the inward movement of the rod 30 through the outer tube base 18. It is to be understood that the extension travel-limiting member 46 may be positioned intermediate the extension responsive member 52, 52' and the one opposed end region 34 of the damper rod 30.

As such, the travel-limiting member 42 is generally used to engage the damper 48 once the energy-managing member 38 has traveled its stroke, thus engaging the damper function. As referenced herein, in one non-limitative embodiment, the stroke may be about +/−2 mm.

FIG. 1 also shows the strut spring(s) 58 and the spring seat 60 for such strut spring(s) 58. The strut spring 58 supports most of the sprung mass 14 supported by the damper assembly 10 under static conditions.

Figure 4:
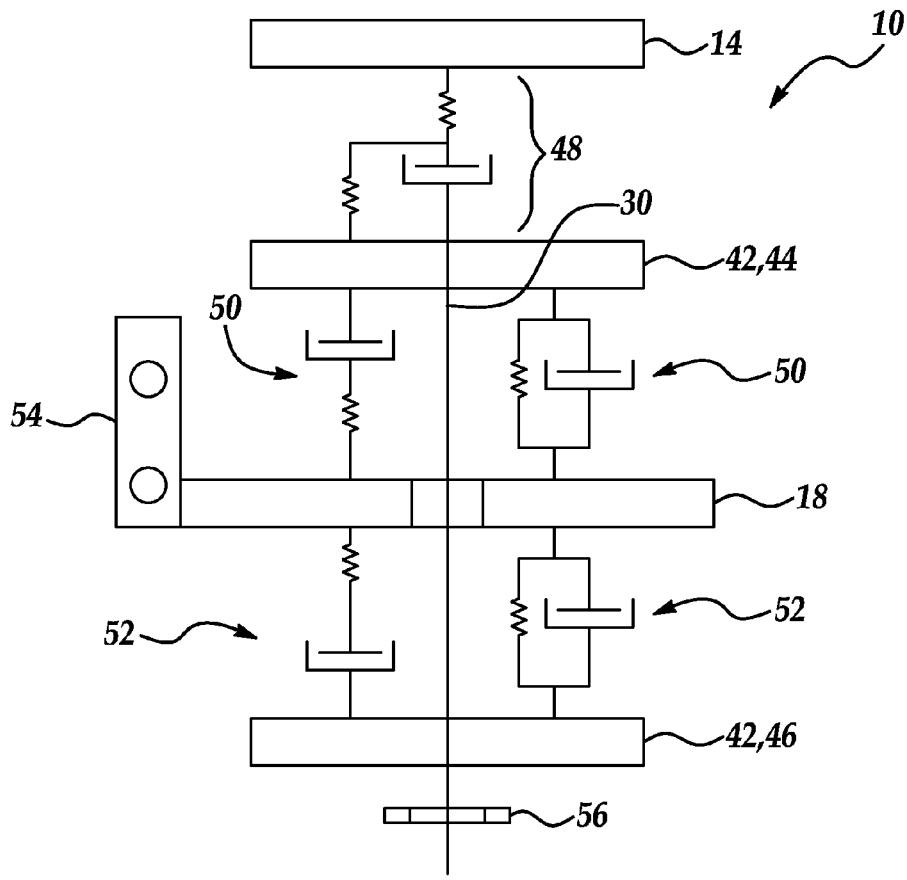
FIG. 4 is a schematic view depicting the function of an embodiment of a decoupled mono tube damper assembly.

FIG. 4 schematically depicts the function of the damper assembly 10. Additionally, FIG. 4 shows a knuckle attachment 54 attached to the outer tube base 18, and a nut 56 attached to the rod 30. The energy-managing members 50, 52 generally have stiffness and a damping component. There may also be some sticking associated with these members 50, 52 as they travel. As such, there may be both series (left side of figure) and parallel (right side of figure) elements to these event(s).

The nut 56 is adapted to pre-load (if desired) the compression and/or extension responsive members 50, 50', 52 and/or 52'. The responsive members 50, 52 react to forces that are smaller than those that are capable of overcoming stiction and activating the damping mechanism 48. When relatively large forces are applied, the travel-limiting member 42 engages (not depicted in FIG. 4), and the main damping mechanism 48 becomes active. It is to be understood that the force to activate the responsive members 50, 52 is lower than the force to activate the damping mechanism 48.

It is to be understood that the terms "attached/attaches/attaching to," "connected/connects/connecting to," and/or the like are broadly defined herein to encompass a variety of divergent connected arrangements and assembly techniques. These arrangements and techniques include, but are not limited to (1) the direct attachment of one component to another component with no intervening components therebetween; and (2) the attachment of one component to another component with one or more components therebetween, provided that the one component being "attached to" or "connected/ing to" the other component is somehow "supported" by the other component (notwithstanding the presence of one or more additional components therebetween).

Figure 5:
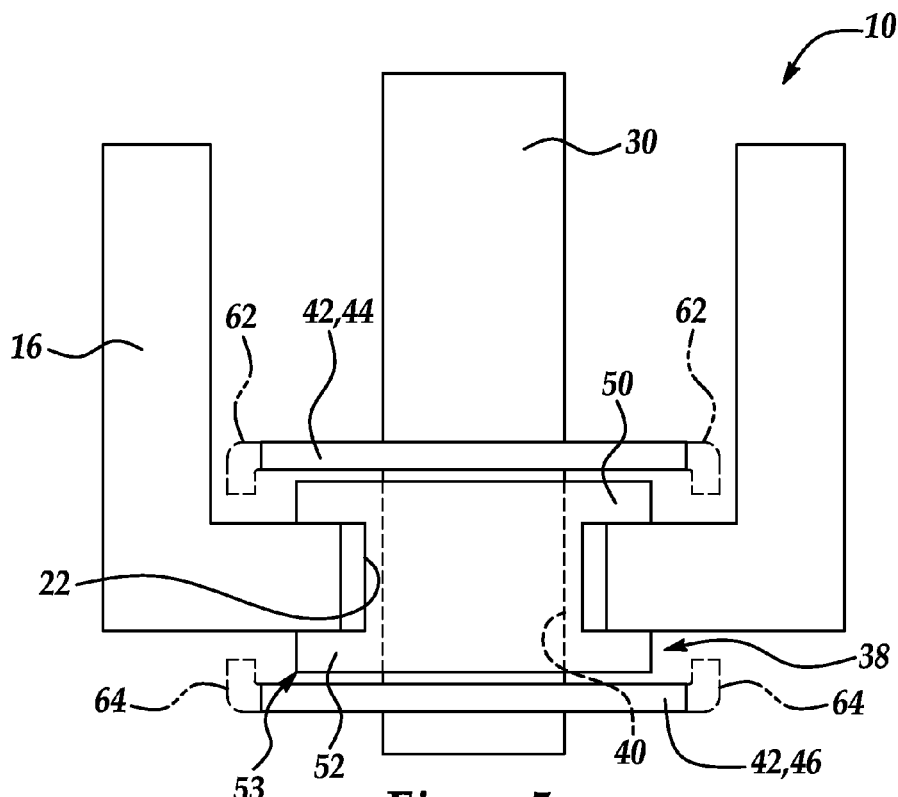
FIG. 5 is a semi-schematic view of an alternate embodiment of a decoupled mono tube damper assembly.

FIG. 5 depicts an alternate embodiment of the damper assembly 10. In this embodiment, the compression travel-limiting member 42, 44 may optionally include portions 62 that are formed so they may contact the outer tube 16 upon outward movement of the rod 30. The extension travel-limiting member 42, 46 may also optionally include portions 64 that are formed so they may contact the outer tube 16 upon inward movement of the rod 30. It is to be understood that in this embodiment, the travel-limiting members 44, 46 still engage the respective responsive members 50, 50', 52, 52'.

Figure 6:
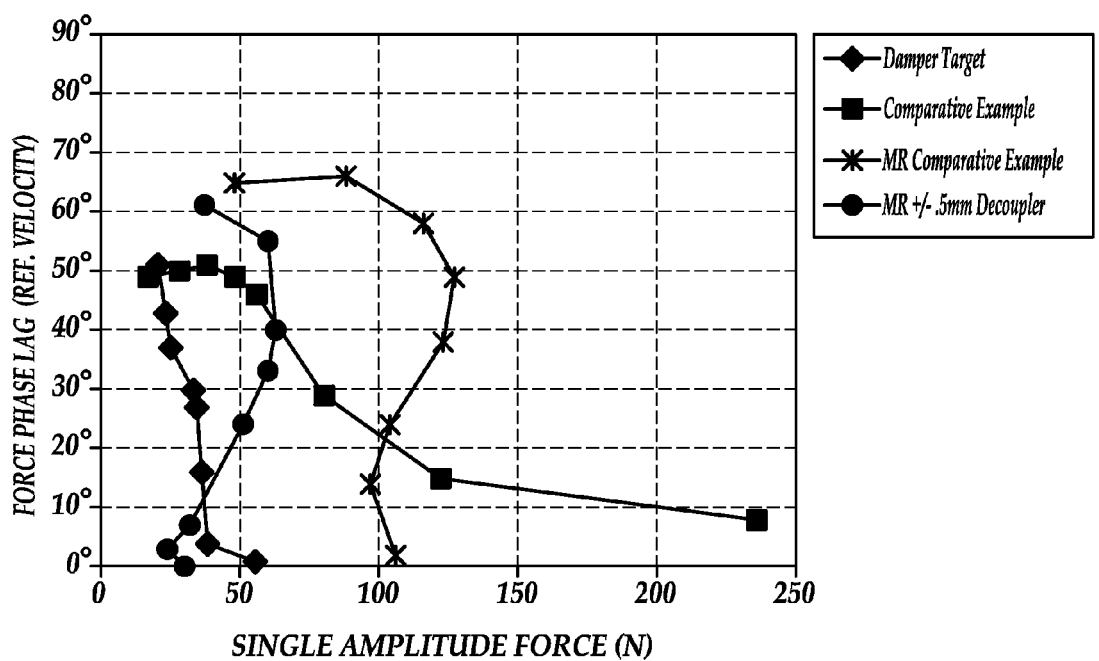
FIG. 6 is a graph depicting force phase lag versus single amplitude force.

FIG. 6 is a graph plotting force phase lag versus single amplitude force for various examples. 0° is a perfect damper, while 90° is a perfect spring. The objective is generally to reach 0° as quickly as possible at the lowest amount of input force. As can be seen from the data plots, the damper assembly 10 of the present disclosure (designated as "MR +/−0.5 mm Decoupler") is closer to the damper target than is either of the two comparative examples.

Figure 7:
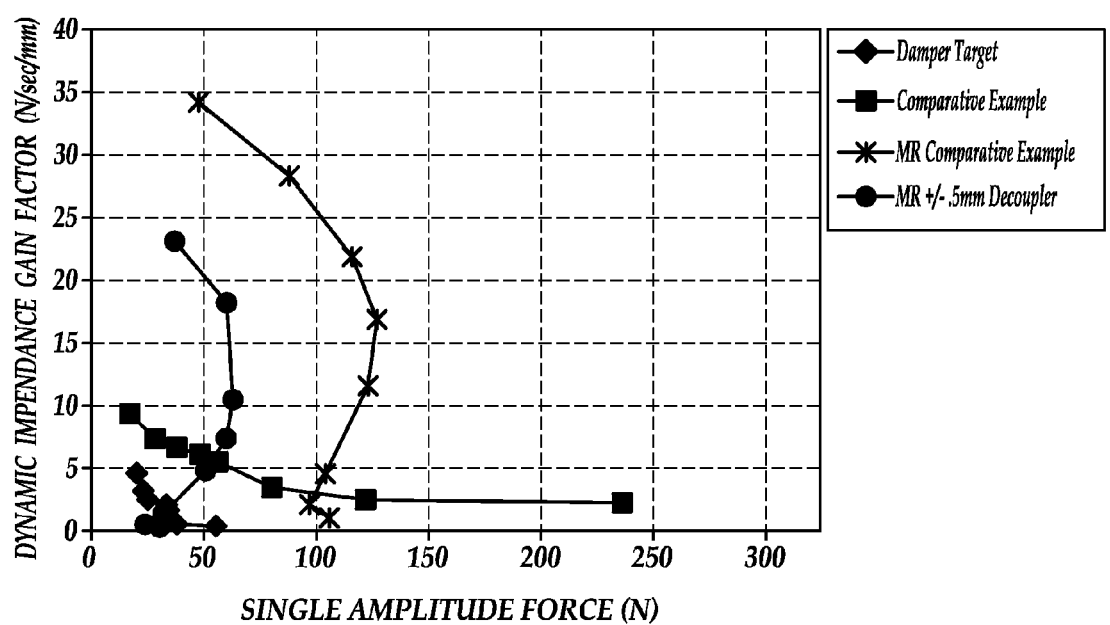
FIG. 7 is a graph depicting dynamic impedance gain factor versus single amplitude force.

FIG. 7 is a graph plotting dynamic impedance gain factor versus single amplitude force. This graph shows how much force it takes to move a particular body. The objective is generally to overcome impedance from one or more sources (e.g. stiction, friction, seal swelling, and/or the like) with the least amount of force. As can be seen from the data plots, the damper assembly 10 of the present disclosure (designated again as "MR +/−0.5 mm Decoupler") is closer to the damper target than is either of the two comparative examples.

While several embodiments have been described in detail, it will be apparent to those skilled in the art that the disclosed embodiments may be modified. Therefore, the foregoing description is to be considered exemplary rather than limiting.

The invention claimed is:

1. A decoupled mono tube damper assembly for a vehicle having an unsprung mass and a sprung mass, the damper assembly comprising:

an outer tube adapted to be attached to the unsprung mass and having a base and a sleeve end, the base having an aperture therethrough;
an inner tube having an outer tube sleeve engaging end slidingly engaged with the sleeve end, the inner tube having an end distal to the sleeve engaging end, the inner tube adapted to be attached to the sprung mass at the distal end;
a damper rod having two opposed end regions, one of the two opposed end regions extending axially into the base aperture, and the other of the two opposed end regions connected to the inner tube, the damper rod adapted to move axially relative to the outer tube;
a low amplitude energy-managing member configured to manage energy resulting from displacements ranging from about 0.05 mm to about 2 mm of the decoupled mono tube damper, wherein the low amplitude energy-managing member is operatively disposed at least partially within the outer tube, the energy-managing member having a throughbore which receives the damper rod; and
at least one travel-limiting member attached to the damper rod and engageable with the energy-managing member, the travel-limiting member adapted to constrain axial movement of the rod through the outer tube base to a predetermined limit.

2. The decoupled mono tube damper assembly as defined in claim 1 wherein the low amplitude energy-managing member is adapted to manage energy of forces smaller than those adapted to activate a damping mechanism operatively disposed within the inner tube.

3. The decoupled mono tube damper assembly as defined in claim 1 wherein the low amplitude energy-managing member comprises:

a low amplitude extension responsive member; and
a low amplitude compression responsive member.

4. The decoupled mono tube damper assembly as defined in claim 3 wherein the at least one travel-limiting member comprises:

an extension travel-limiting member attached to the damper rod and adapted to constrain inward movement of the rod through the outer tube base; and
a compression travel-limiting member attached to the damper rod and adapted to constrain outward movement of the rod through the outer tube base.

5. The decoupled mono tube damper assembly as defined in claim 3 wherein the extension responsive member and the compression responsive member comprise an integral member extending through the base aperture, with the extension responsive member forming a flanged face of the integral member, disposed outside of the outer tube base, and the compression responsive member forming an opposed flanged face of the integral member, disposed within the outer tube base.

6. The decoupled mono tube damper assembly as defined in claim 3 wherein the extension responsive member and the compression responsive member are separate members, with the extension responsive member operatively disposed outside of the outer tube base, and the compression responsive member operatively disposed within the outer tube base.

7. The decoupled mono tube damper assembly as defined in claim 6 wherein the at least one travel-limiting member comprises:

a compression travel-limiting member attached to the damper rod and adapted to constrain outward movement of the rod through the outer tube base, the compression travel-limiting member positioned intermediate the compression responsive member and the other of the damper rod two opposed end regions; and an extension travel-limiting member attached to the damper rod and adapted to constrain inward movement of the rod through the outer tube base, the extension travel-limiting member positioned intermediate the extension responsive member and the one of the damper rod two opposed end regions.

8. The decoupled mono tube damper assembly as defined in claim 3 wherein each of the low amplitude extension responsive member and the low amplitude compression responsive member is formed from at least one of viscoelastic materials, thermoplastic materials, thermoplastic elastomer materials, thermoset materials, and combinations thereof.

9. The decoupled mono tube damper assembly as defined in claim 1 wherein the low amplitude energy-managing member is at least one spring.

10. The decoupled mono tube damper assembly as defined in claim 9 wherein the at least one spring is a helical spring.

11. The decoupled mono tube damper assembly as defined in claim 1 wherein the low amplitude energy-managing member is formed from at least one of viscoelastic materials, thermoplastic materials, thermoplastic elastomer materials, thermoset materials, and combinations thereof.

12. A decoupled mono tube damper assembly for a vehicle having an unsprung mass and a sprung mass, the damper assembly comprising:

an outer tube adapted to be attached to the unsprung mass and having a base and a sleeve end, the base having an aperture therethrough;

an inner tube having an outer tube sleeve engaging end slidingly engaged with the sleeve end, the inner tube having an end distal to the sleeve engaging end, the inner tube adapted to be attached to the sprung mass at the distal end;

a damper rod having two opposed end regions, one of the two opposed end regions extending axially into the base aperture, and the other of the two opposed end regions connected to the inner tube, the damper rod adapted to move axially relative to the outer tube as a result of forces transmitted thereto from the unsprung mass;

a low amplitude energy-managing member configured to manage energy resulting from displacements ranging from about 0.05 mm to about 2 mm of the decoupled mono tube damper, wherein the low amplitude energy-managing member is operatively disposed at least partially within the outer tube, the energy-managing member having a throughbore which receives the damper rod, the low amplitude energy-managing member including a low amplitude extension responsive member and a low amplitude compression responsive member;

an extension travel-limiting member attached to the damper rod and adapted to constrain inward movement of the rod through the outer tube base; and a compression travel-limiting member attached to the damper rod and adapted to constrain outward movement of the rod through the outer tube base.

13. The decoupled mono tube damper assembly as defined in claim 12 wherein the extension responsive member and the compression responsive member comprise an integral member extending through the base aperture, with the extension responsive member forming a flanged face of the integral member, disposed outside of the outer tube base, and the compression responsive member forming an opposed flanged face of the integral member, disposed within the outer tube base.

14. The decoupled mono tube damper assembly as defined in claim 12 wherein the extension responsive member and the compression responsive member are separate members, with the extension responsive member operatively disposed outside of the outer tube base, and the compression responsive member operatively disposed within the outer tube base.

15. The decoupled mono tube damper assembly as defined in claim 14 wherein the rod extension travel-limiting member is positioned intermediate the rod extension energy-absorbing member and the other of the damper rod two opposed end regions; and wherein the rod compression travel-limiting member is positioned intermediate the rod compression energy-absorbing member and the one of the damper rod two opposed end regions.

16. A motor vehicle having reduced vibrations, the motor vehicle comprising:

an outer tube adapted to be attached to the unsprung mass and having a base and a sleeve end, the base having an aperture therethrough;

an inner tube having an outer tube sleeve engaging end slidingly engaged with the sleeve end, the inner tube having an end distal to the sleeve engaging end, the inner tube adapted to be attached to the sprung mass at the distal end;

a damper rod having two opposed end regions, one of the two opposed end regions extending axially into the base aperture, and the other of the two opposed end regions connected to the inner tube, the damper rod adapted to move axially relative to the outer tube as a result of forces transmitted thereto from the unsprung mass;

a low amplitude energy-managing member configured to manage energy resulting from displacements ranging from about 0.05 mm to about 2 mm of the decoupled mono tube damper, wherein the low amplitude energy-managing member is operatively disposed at least partially within the outer tube, the energy-managing member having a throughbore which receives the damper rod; and at least one travel-limiting member attached to the damper rod and engageable with the energy-managing member, the travel-limiting member adapted to constrain axial movement of the rod through the outer tube base to a predetermined limit.

17. The motor vehicle as defined claim 16 wherein the low amplitude energy-managing member comprises:

a low amplitude extension responsive member; and
a low amplitude compression responsive member.

18. The motor vehicle as defined in claim 16 wherein the at least one travel-limiting member comprises:

an extension travel-limiting member attached to the damper rod and adapted to constrain inward movement of the rod through the outer tube base; and a compression travel-limiting member attached to the damper rod and adapted to constrain outward movement of the rod through the outer tube base.

* * * * *